United States Patent
Hooda et al.

(10) Patent No.: US 10,547,467 B2
(45) Date of Patent: Jan. 28, 2020

(54) SELECTIVE TRAFFIC LEAKING IN ENTERPRISE FABRIC WITH EXTRANET

(71) Applicant: Cisco Technology, Inc., San Jose, CA (US)

(72) Inventors: Sanjay Kumar Hooda, Pleasanton, CA (US); Prakash C. Jain, Fremont, CA (US); Rishabh Parekh, San Jose, CA (US); Atri Indiresan, Sunnyvale, CA (US); Satish Kondalam, Milpitas, CA (US); Victor Moreno, Carlsbad, CA (US)

(73) Assignee: Cisco Technology, San Jose, CA (US)

( * ) Notice: Subject to any disclaimer, the term of this patent is extended or adjusted under 35 U.S.C. 154(b) by 9 days.

(21) Appl. No.: 15/792,180

(22) Filed: Oct. 24, 2017

(65) Prior Publication Data
US 2018/0367328 A1    Dec. 20, 2018

Related U.S. Application Data

(60) Provisional application No. 62/522,013, filed on Jun. 19, 2017.

(51) Int. Cl.
*H04L 12/18* (2006.01)
*H04L 29/12* (2006.01)
(Continued)

(52) U.S. Cl.
CPC ........ *H04L 12/1886* (2013.01); *H04L 12/185* (2013.01); *H04L 12/1818* (2013.01);
(Continued)

(58) Field of Classification Search
CPC ..... H04L 12/1886; H04L 12/18; H04L 12/02; H04L 12/00; H04L 12/1818;
(Continued)

(56) References Cited

U.S. PATENT DOCUMENTS 7,539,205 B1   5/2009   Deshpande
7,715,419 B2 * 5/2010   Tatar ................... H04L 49/1546
                                                  370/230
(Continued)

*Primary Examiner* — Jeffrey M Rutkowski
*Assistant Examiner* — Luna Weissberger
(74) *Attorney, Agent, or Firm* — Edell, Shapiro & Finnan, LLC

(57) ABSTRACT

A method including determining that network traffic being transmitted is unicast or multicast; mapping to which virtual network and locator address each host belongs; generating leaking data for unicast and multicast traffic, wherein the leaking data indicates that a first virtual network leaks traffic to a second virtual network; receiving a request from the second virtual network to receive traffic from a host in the first virtual network; determining, based on the leaking data and the type of traffic being transmitted, if the first virtual network leaks traffic to the second virtual network; if the first virtual network leaks traffic to the second virtual network, determining a locator address for the host in the first virtual network using the mapping data; and transmitting the locator address for the host to the second virtual network to enable traffic leaking from the host to the second virtual network is disclosed.

20 Claims, 14 Drawing Sheets

(51) Int. Cl.
*H04L 29/06* (2006.01)
*H04L 12/853* (2013.01)

(52) U.S. Cl.
CPC ...... H04L 61/2069 (2013.01); *H04L 47/2416* (2013.01); *H04L 65/1093* (2013.01)

(58) Field of Classification Search
CPC ............... H04L 12/1813; H04L 12/185; H04L 61/2069; H04L 61/20; H04L 47/2416; H04L 47/24; H04L 47/10; H04L 47/00; H04L 47/70; H04L 47/72; H04L 47/74; H04L 47/78; H04L 47/80; H04L 65/1093; H04L 65/1086; H04L 65/1083; H04L 65/1066; H04L 65/10
USPC ......................................................... 370/230
See application file for complete search history.

(56) References Cited

U.S. PATENT DOCUMENTS

| | | | |
|---|---|---|---|
| 7,925,778 B1 | 4/2011 | Wijands et al. | |
| 7,944,938 B2 | 5/2011 | Despande | |
| 9,088,544 B1* | 7/2015 | Pan | H04L 63/0263 |
| 9,548,917 B2 | 1/2017 | Jain et al. | |
| 2006/0002391 A1 | 1/2006 | Takihiro et al. | |
| 2006/0088031 A1 | 4/2006 | Nalawade | |
| 2007/0147372 A1 | 6/2007 | Lie et al. | |
| 2009/0219934 A1 | 9/2009 | Deshpande | |
| 2010/0329252 A1* | 12/2010 | Mulamalla | H04L 12/18 370/390 |
| 2013/0103819 A1* | 4/2013 | Meyer | H04L 9/00 709/223 |
| 2015/0085638 A1* | 3/2015 | Li | H04L 45/50 370/217 |
| 2015/0263864 A1* | 9/2015 | Yang | H04L 12/185 370/390 |
| 2016/0065531 A1* | 3/2016 | Xiaopu | H04L 61/103 709/238 |
| 2016/0134526 A1* | 5/2016 | Maino | H04L 45/505 709/226 |

* cited by examiner

| UNICAST LEAKING BIT | MULTICAST LEAKING BIT | RESULT |
|---|---|---|
| 0 | 0 | NO UNICAST OR MULTICAST LEAKING |
| 0 | 1 | NO UNICAST LEAKING, MULTICAST LEAKING ONLY |
| 1 | 0 | ONLY UNICAST LEAKING |
| 1 | 1 | BOTH UNICAST AND MULTICAST LEAKING |

FIG.2

| TYPE | EID | {RLOC, SRCVN, DSTVN} |
|---|---|---|
| UNICAST | 10.1.1.1 | {FE1, VN1, VN1} |
| MULTICAST | 10.1.1.1 | {FE1, {VN2 OR VN3}, VN1} |

SELECTIVE TRAFFIC LEAKING IN ENTERPRISE FABRIC WITH EXTRANET

PRIORITY CLAIM

This application claims priority to U.S. Provisional Application No. 62/522,013, filed Jun. 19, 2017, the entirety of which is incorporated herein by reference.

TECHNICAL FIELD

The present disclosure is related to selectively leaking traffic among a plurality of virtual networks.

BACKGROUND

Large media entities (e.g., large media customers) or entities that frequently utilize multicast networking may desire to perform selective traffic leaking for multicast and unicast network traffic. In some implementations, software defined access (SDA) or digital network architecture (DNA) allows selective traffic leaking with selective virtual network leaking. However, there currently exists no mechanism for selectively leaking network traffic based on the type of traffic, such as unicast or multicast, in a Locator/Identifier Separation Protocol (LISP) network.

BRIEF DESCRIPTION OF THE DRAWINGS

FIG. 2 is a truth table configured to determine whether any network traffic is leaked, according to an example embodiment of this disclosure.

FIG. 9 is a table showing a response from a map server map resolver (MSMR) to a map request from an ingress or egress tunnel router (xTR), according to an example embodiment of this disclosure.

DESCRIPTION OF EXAMPLE EMBODIMENTS

Overview

Presented herein are techniques for selectively leaking network traffic among a plurality of virtual networks. For example, a map server map resolver (MSMR) may determine what type of network traffic, e.g., unicast or multicast, is being allowed to be transmitted by a host in a virtual network. The MSMR may generate mapping data that maps to which virtual network and which device associated with a routing locator each host belongs. The MSMR may also generate leaking data for unicast and multicast network traffic. The leaking data may indicate that a first virtual network leaks data to a second virtual network. Then, the MSMR may receive a request from the second virtual network to receive leaked data from a host in the first virtual network. The MSMR may determine, based on the destination of the leaking data and the type of network traffic being transmitted, if the first virtual network leaks data to the second virtual network. If it is determined that the first virtual network can leak data to the second virtual network, then the MSMR may determine a locator address for the host transmitting the multicast traffic. The MSMR may provide the locator address to the second virtual network to enable traffic leaking.

Example Embodiments

Some network service providers want to selectively leak traffic based on traffic type. For example, a user may want to selectively leak only multicast traffic but not leak unicast traffic. In this example, the leaked multicast traffic would bypass a firewall. On the other hand, the unicast traffic would go through the firewall. Therefore, the unicast traffic would flow through the firewall across multiple virtual networks while the leaked multicast traffic would be leaked across the virtual networks and therefore does not flow through the firewall. Other configurations, such as not leaking unicast or multicast traffic, leaking unicast but not multicast traffic, and leaking both unicast and multicast traffic may be desired. The techniques of this disclosure enable providers to configure their network to achieve this selective leaking.

An exemplary Locator/Identifier Separation Protocol (LISP) network is described. Therefore, unicast leaking in the LISP network is described, followed by multicast leaking in the LISP network. Finally, techniques are described as to how to selectively leak unicast and/or multicast network traffic in the LISP network.

Figure 1:
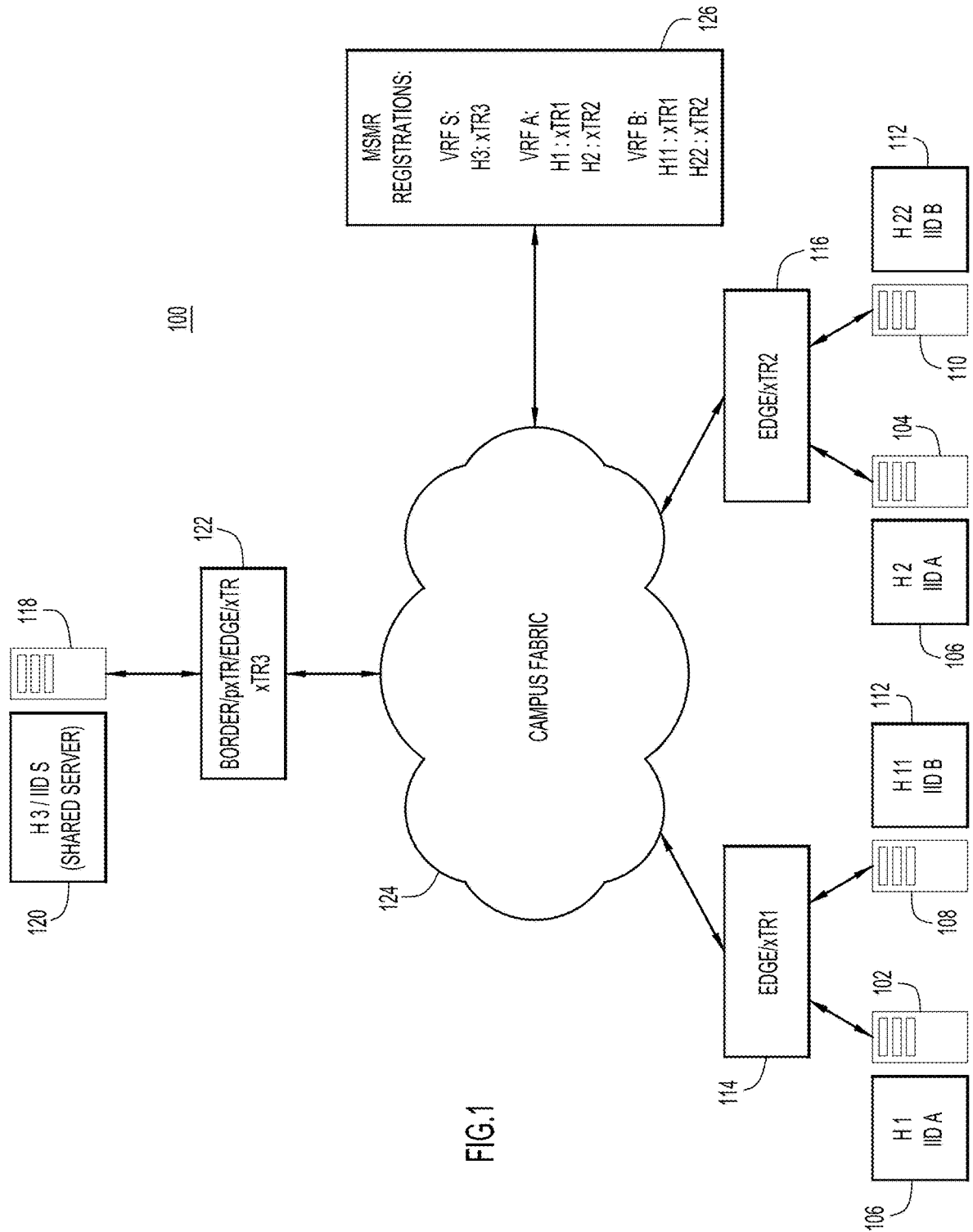
FIG. 1 is a diagram of a Locator/Identifier Separation Protocol (LISP) network configured to perform traffic leaking, according to an example embodiment of this disclosure.

Turning to FIG. 1, FIG. 1 is a diagram 100 of a LISP network configured for traffic leaking, according to an example embodiment of this disclosure. The LISP protocol may be used as an overlay protocol in a network, such as a secure campus fabric and software defined access (SDA) architectures for enterprise and datacenter networks. Virtual routing and forwarding (VRF), virtual private networks (VPNs), and virtual local access networks (VLANs) may be used to provide segmentation, isolation, and security among various sections of such networks. Individual VRFs, VPNs, and VLANs may be referred to as subscribers herein. Usually, secured VRFs, VPNs, and VLANs do not communicate with each other. For example, an enterprise in a software service business may serve various clients from a single campus, where different clients need isolation or security from each other. However, the serving enterprise might also have some shared resources, such as a domain name service (DNS), printers, or servers, in a shared VRF/VPN/VLAN (may be referred to as provider herein). This sharing may use inter-VRF, inter-VPN, and inter-VLAN communication between the clients and enterprise shared resources while maintaining the security or isolation among the clients. Such subscriber to provider communication may also be referred to as extranet communication.

The LISP features which support such inter-VRF, inter-VPN, and inter-VLAN communication are called LISP VRF leaking, LISP VPN leaking, LISP VLAN leaking, LISP Instance ID (IID) leaking, or LISP extranet. Without these features, LISP allows communication among hosts which are a part of the same VRF, VPN, or VLAN. For example, a host in a first VPN would not be able to communicate with a host in a second VPN. As a further example illustration, as shown in FIG. 1, hosts H1 102 and H2 104 are located within instance identifier (IID) A 106 and hosts H11 108 and H22 110 are located within IID B 112. The hosts H1 102, H2 104, H11 108, and H22 110 may be identified by their host endpoint identifiers (EIDs). The hosts H1 102, H2 104, H11 108, and H22 110 may be connected to a network device 114, 116, such as a border router, an egress tunnel router (ETR), an ingress tunnel router (ITR), or an egress and ingress tunnel router (xTR). The location of the hosts H1 102, H2 104, H11 108, and H22 110 may be located using a resource locator (RLOC), which may be an address, associated with the network devices 114, 116. In FIG. 1, hosts H1 102 and H11 108 are connected to network device xTR1 114 and hosts H2 104 and H22 110 are connected to network device xTR2 116. At least some of the hosts in IID A 106 and IID B 112 may need to access shared services from server H3 118. Server H3 may be located in IID S 120. Server H3 118 may be connected to a network device xTR3 122, such as a border router. The network devices 114, 116, 122 may be connected to the campus fabric 124, which may implement LISP.

LISP learned mappings are usually kept within a single IID context and not shared across IIDs. If two hosts, for example, hosts H1 102 and H11 108, wish to communicate with each other across the IIDs, LISP needs to support LISP IID leaking or LISP extranet. While this disclosure explains the concepts in the scope of VPN instance IDs leaking only, one of ordinary skill in the art would readily recognize that a similar design can be extended to VLAN instance IDs leaking as well.

To support LISP extranet or IID leaking, a map server (MS) and a map resolver (MR) policy-based architecture may be chosen. The MS and the MR may be a part of a LISP control plane. ETRs may register their associated host EIDs with the MS. The MR may receive map requests from ITRs. The MR may then forward the map requests to registered ETRs to resolve the mappings. The MS and MR may be implemented in separate devices. Alternatively, the MS and the MR may be implemented in a single device, in which case the single device may be referred to as a map server map resolver (MSMR). This disclosure will describe exemplary embodiments using an MSMR 126. The MSMR 126 shown in FIG. 1 includes the network mappings. The network mappings indicate which hosts are connected to which network devices xTR1 114 and xTR2 116 as well as the IIDs 106, 112 of the hosts.

The MSMR 126, based on an extranet policy stored at the MSMR 126, may facilitate leaking network traffic across VRFs, VPNs, IIDs, and VLANs. The extranet policy stored at the MSMR 126 may determine which IIDs may leak network traffic to which other IIDs. Broadly, an ETR may detect local hosts, such as hosts H1 102 and H11 108, and their respective prefixes. The ETR may then register the local hosts and their respective prefixes with the MSMR 126 in the corresponding IID. ITRs may generate a map request for one or more prefixes for the hosts local to the ETR and the corresponding IID. The ITR may transmit the map request to the MSMR 126.

The MSMR 126 may then reply to the received map request. The MSMR 126 may first perform a lookup for the destination local host and its prefix in the corresponding IID. If the MSMR 126 fails to find the local host and its prefix within the corresponding IID, the MSMR 126 may perform a lookup in an extranet policy table to determine the IID for the destination local host. Once the MSMR 126 has determined the IID for the destination local host, the MSMR 126 may perform a lookup for the host and its prefix in the IID for the destination local host. If the MSMR 126 finds the host, the MSMR may reply to the map request from the ITR in the context of the corresponding (first) IID. However, the MSMR 126 may encapsulate, within the map request reply, an additional parameter, such as an Encapsulation IID, that indicates the IID for the destination local host. For such extranet communications, the MSMR 126 may reply on behalf of the ETR instead of forwarding the map request to the ETR.

Once the ITR receives the map request reply from the MSMR 126, the ITR may generate or add to a previously generated map cache. The ITR may insert both the corresponding IID and the IID for the destination local host into the map cache. When receiving network traffic, the ITR may use the corresponding IID to match or classify incoming network traffic. However, when transmitting network traffic to a remote RLOC, the ITR may encapsulate the IID for the destination local host in a packet of the network traffic.

Turning to FIG. 2, FIG. 2 is a truth table 200 that may be stored at the MSMR 126 shown in FIG. 1 to determine whether any network traffic is leaked, according to an example embodiment of this disclosure. For example, FIG. 2 has a unicast leaking bit 202, a multicast leaking bit 204, and a result 206. When the unicast leaking bit 202 and the multicast leaking bit 204 are both zero, then the result 206 is that neither unicast nor multicast traffic is leaked. When the unicast leaking bit 202 is zero and the multicast leaking bit 204 is one, unicast traffic is not leaked but multicast traffic is leaked. When the unicast leaking bit 202 is one and the multicast leaking bit 204 is zero, unicast traffic is leaked but multicast traffic is not leaked. When both the unicast leaking bit 202 and the multicast leaking bit 204 are one, then both unicast and multicast traffic is leaked. A table such as this may be stored and generated at the MSMR. The table 200 of FIG. 2 may be used to selectively leak traffic among virtual networks.

This disclosure describes both unicast traffic leaking and multicast traffic leaking.

Figure 3:
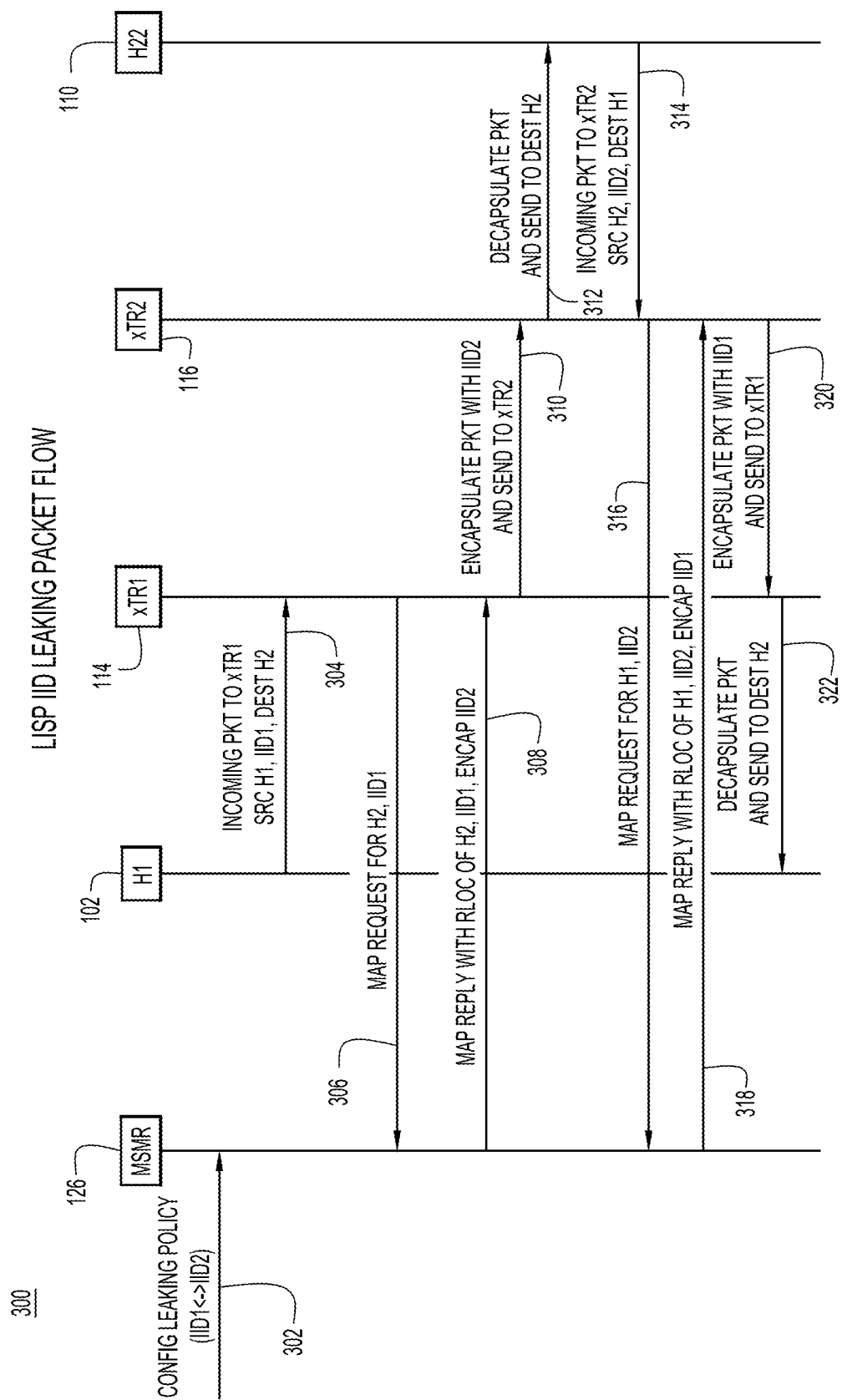
FIG. 3 is a sequence diagram of steps taken in a LISP network to perform unicast traffic leaking, according to an example embodiment of this disclosure.

Turning to FIG. 3, FIG. 3 is a high level sequence diagram 300 of steps taken in a LISP network to perform unicast traffic leaking, according to an example embodiment of this disclosure. The sequence diagram shows network traffic flows among the MSMR 126, host H1 102, network device xTR1 114, network device xTR2 116, and host H22 112. To this end, reference is also made to FIG. 1 for purposes of the description of FIG. 3. The MSMR 126 may receive a leaking policy configuration 302. The leaking policy configuration 302 may be in the form of an extranet policy table as described above. For example, the MSMR 126 may receive a leaking policy 302 between two IIDs: IID A 106 and IID B 112. The MSMR 126 may determine, based on this leaking policy configuration 302, whether network traffic may be leaked between the two IIDs and, if so, in which direction the network traffic may be leaked. For example, the leaking policy configuration 302 may only enable network traffic leaking from IID A 106 to IID B 112. Alternatively, the leaking policy configuration 302 may enable network traffic leaking from IID B 112 to IID A 106 or enable network traffic leaking in both directions.

Next, at 304, host H1 102, which may have an EID as EID1, may transmit network traffic to network device xTR1 114. Host H1 102 and network device xTR1 106 are both in the same IID; here, they are both a part of IID A 106. The network traffic transmitted from host H1 106 to network device xTR1 114 may include a source address of host H1 102 in the context of IID A 106 and a destination address of host H22 110.

Network device xTR1 114, in response to receiving the packet from host H1 102, may then send a map request at 306 to the MSMR 126 for host H22 110 in the context of IID A 106. Network device xTR1 114 transmits the map request for host H22 110 in the context of IID A 106 because each IID is isolated from the other IIDs, as described above. However, in this example, host H2 110 is located in the context of IID B 112, not the context of IID A 106. Therefore, the MSMR 126, based on the leaking configuration profile 302, generates a map reply at 308 to transmit to the network device xTR1 114. The map reply may include an RLOC associated with the host H22 110 in the context of IID A 106. The RLOC associated with the host H22 110 may be the network address of the network device xTR2 116. The map reply may also encapsulate IID B 112 as the context of host H22 110.

After receiving the map reply from the MSMR 126, at 310, the network device xTR1 114 may encapsulate the context IID B 112 within the network traffic 304 it received from host H1 102. The network device xTR1 114 may then transmit the encapsulated network traffic 310 to network device xTR2 116, which has the context of IID B 112. At 312, the network device xTR2 116 may then decapsulate the received network traffic. When decapsulating the received network traffic, the network device xTR2 116 may transmit the network traffic to the context IID B 112, which contains host H22 110. The network device xTR2 116 may then transmit the network traffic sent by host H1 102 to host H22 110.

The host H22 110 may reply to host H1 102 in a similar manner as to how host H1 102 communicates with host H2 110, as described above. For example, at 314, host H22 110 may transmit network traffic to network device xTR2 116. This network traffic may include as a source address the address of host H22 110 in the context of IID B 112 and a destination address of host H1 102.

After network device xTR2 116 receives the network traffic 314 from host H22 110, the network device xTR2 116 may then transmit a map request at 316 to the MSMR 126. The map request transmitted to the MSMR 126 may request host H1 102 in the context of IID A 106. The MSMR 126, based on the leaking configuration profile 302, generates a map reply at 318 to transmit to the network device xTR2 116. Network device xTR2 116 transmits the map request for host H1 102 in the context of IID B 112 because each IID is isolated from the other IIDs, as described above. However, in this example, host H1 102 is located in the context of IID A 106, not the context of IID B 112. Therefore, the MSMR 126, based on the leaking configuration profile 302, generates a map reply to transmit to the network device xTR2 116. The map reply may include an RLOC associated with the host H1 102 and in the context of IID B 112. The map reply may also encapsulate IID A 106 as the context of host H1 102.

After receiving the map reply from the MSMR 126, at 320, the network device xTR2 116 may encapsulate the context IID A 106 within the network traffic 314 it received from host H22 110. The network device xTR2 116 may then transmit the encapsulated network traffic to network device xTR1 114, which has the context of IID A 106. At 322, the network device xTR1 114 may then decapsulate the received network traffic 314. When decapsulating the received network traffic, the network device xTR1 114 may transmit the network traffic 314 to the context IID A 106, which contains host H1 102. The network device xTR1 114 may then transmit the network traffic sent by host H22 110 to host H1 102.

In this manner, unicast network traffic may be leaked across VRFs, VPNs, IIDs, or VLANs without compromising the security and isolation between the VRFs, VPNs, IIDs, or VLANs.

Figure 4:
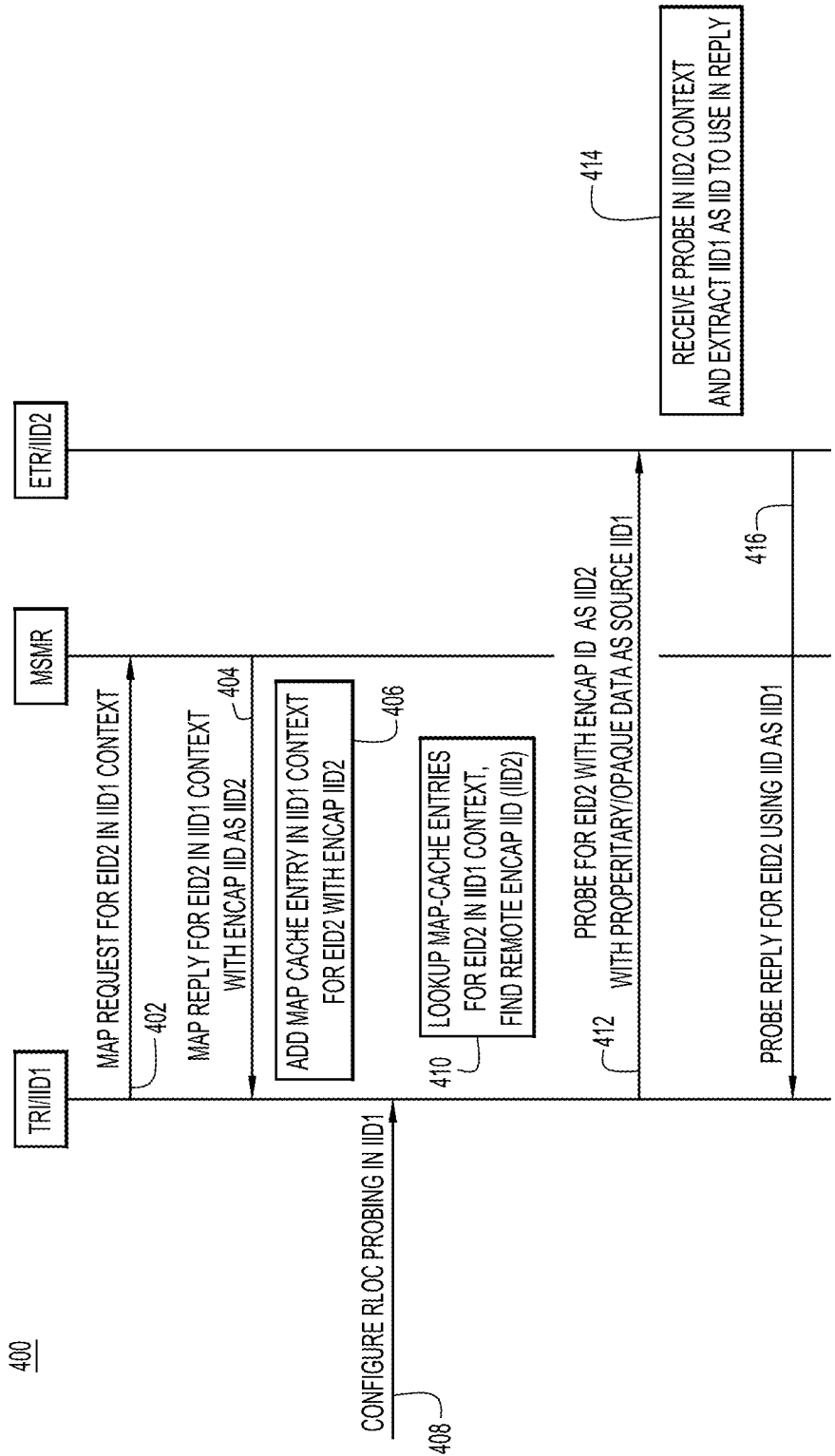
FIG. 4 is a sequence diagram of a probing flow, according to an example embodiment of this disclosure.

Turning to FIG. 4, FIG. 4 is a high level sequence diagram of an RLOC probing flow, according to an example embodiment of this disclosure. Prior to transmitting network traffic from host H1 102 to host H22 110, xTR1 114 may probe the RLOC returned from the MSMR 126 to determine a reachability of host H22 110 on the returned RLOC. FIG. 4 shows the traffic flow to complete this probing, which may be referred to as RLOC probing.

As described above, xTR1 114 transmits a map request 402 to the MSMR 126. The map request 402 may have as a source address the EID of host H1 102 in the context of IID A 106. The destination address may be the EID of host H22 110. The MSMR 126 may then reply 404 to the xTR1 114 with the EID of host H22 210 in the context of IID A 106 and encapsulating IID B 112, as described above. After receiving the map reply 404, xTR1 114 may then add an entry 406 to a map cache for the EID of host H22 110 in the context of IID A 106 with an encapsulation IID of IID B 112. xTR1 114 may then receive a request at 408 to configure RLOC probing in the context of IID A 106. xTR1 114 may then perform a lookup at 410 in the map cache for entries for the EID of host H22 110 in the IID A 106 context. After performing that lookup, xTR1 114 may find there is a remote encapsulated IID for the EID of host H22 110, namely IID B 112. xTR1 114, at 412, may then transmit a probe to xTR2 116, which is in the context of IID B 112. The transmitted probe for the EID of host H22 110 may include an encapsulated context of IID B 112. xTR2 116 may receive the probe in the IID B 112 context at 414. It may use the source IID (IID A 106) of the probe as the reply context. xTR2 116, at 416, may then transmit to xTR1 114 a probe reply for the EID of host H22 110 using IID A 102 as the IID context.

One advantage of using xTR2's IID and encapsulating xTR1's IID is that xTR2 116 does not need to perform any lookups in its databases to find its own IID. Therefore, no configuration of extranet is needed on xTR2 116.

Figure 5:
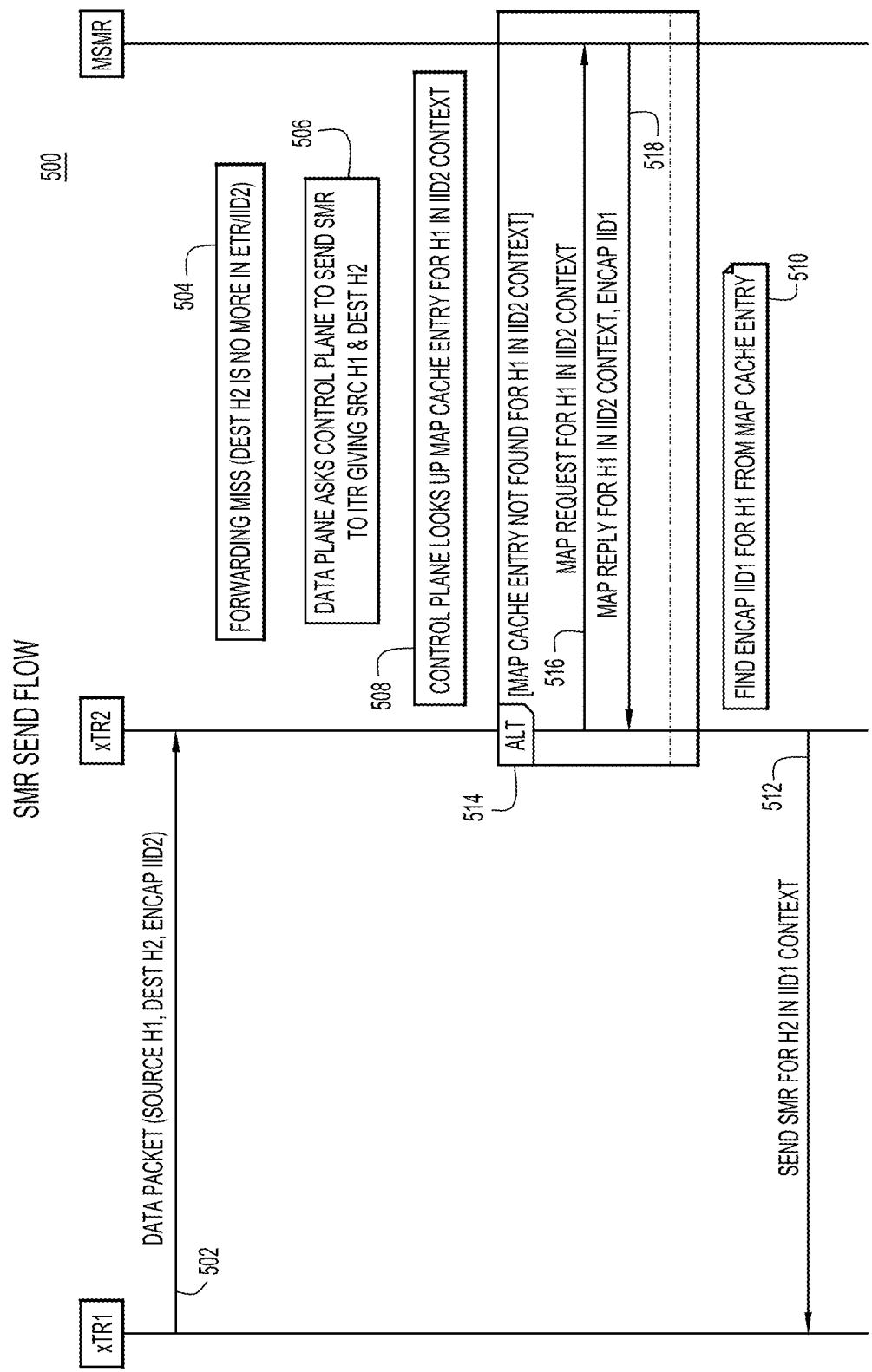
FIG. 5 is a sequence diagram for a Solicit-Map-Request (SMR), according to an example embodiment of this disclosure.

Turning to FIG. 5, FIG. 5 is a high level sequence diagram 500 for a Solicit-Map-Request (SMR), according to an example embodiment of this disclosure. In this example, host H1 102 in the context of IID A 106 has previously sent network traffic to host H22 110 in the context of IID B 112. Now, host H22 110 may have moved and is no longer in the IID B 112 context.

As shown in FIG. 5, at 502 xTR1 114 may transmit network traffic to xTR2 116. This network traffic may have as a source address the EID of host H1 102 in the context of IID A 106. xTR1 114 may have previously received the mapping of host H22 110, the destination of the network traffic, from the MSMR 126 as described above. The network traffic may encapsulate the context of host H22 110, which is IID B 112. xTR2 116 may receive the network traffic from xTR1 114. However, since host H22 110 is no longer in the context of IID B 112, there is a forwarding miss as indicated at 504. At xTR2 116, a data plan may request 506 a control plane to send an SMR to xTR1 114. The data plane may provide a source address of host H1 102 and a destination address of host H22 110. The control plane may then perform a lookup at 508 in a map cache for host H1 102 in the IID B 112 context. After xTR2 116 finds an entry for host H1 102 in the map cache, it may also find 510 the encapsulated IID, in this case IID A 106, for the host H1 102. At 512, xTR2 116 may then transmit an SMR to xTR1 114 in the IID A 106 context. xTR1 114 may then transmit a map request to the MSMR 126 for the new location of host H22 110.

Alternatively, at 514, the control plane may not find an entry for host H1 102 in the IID B 112 context in the map cache. In this scenario, at 516 xTR2 116 may transmit a map request for host H1 102 in the IID B 112 context to the MSMR 126. At 518, the MSMR 126 may reply to the map request from xTR2 116. The map reply may be for host H1 102 in the IID B 112 context. The map reply may also encapsulate the IID A 106 context. After xTR2 116 receives this map reply 518, xTR2 116 may proceed as described previously.

Figure 6:
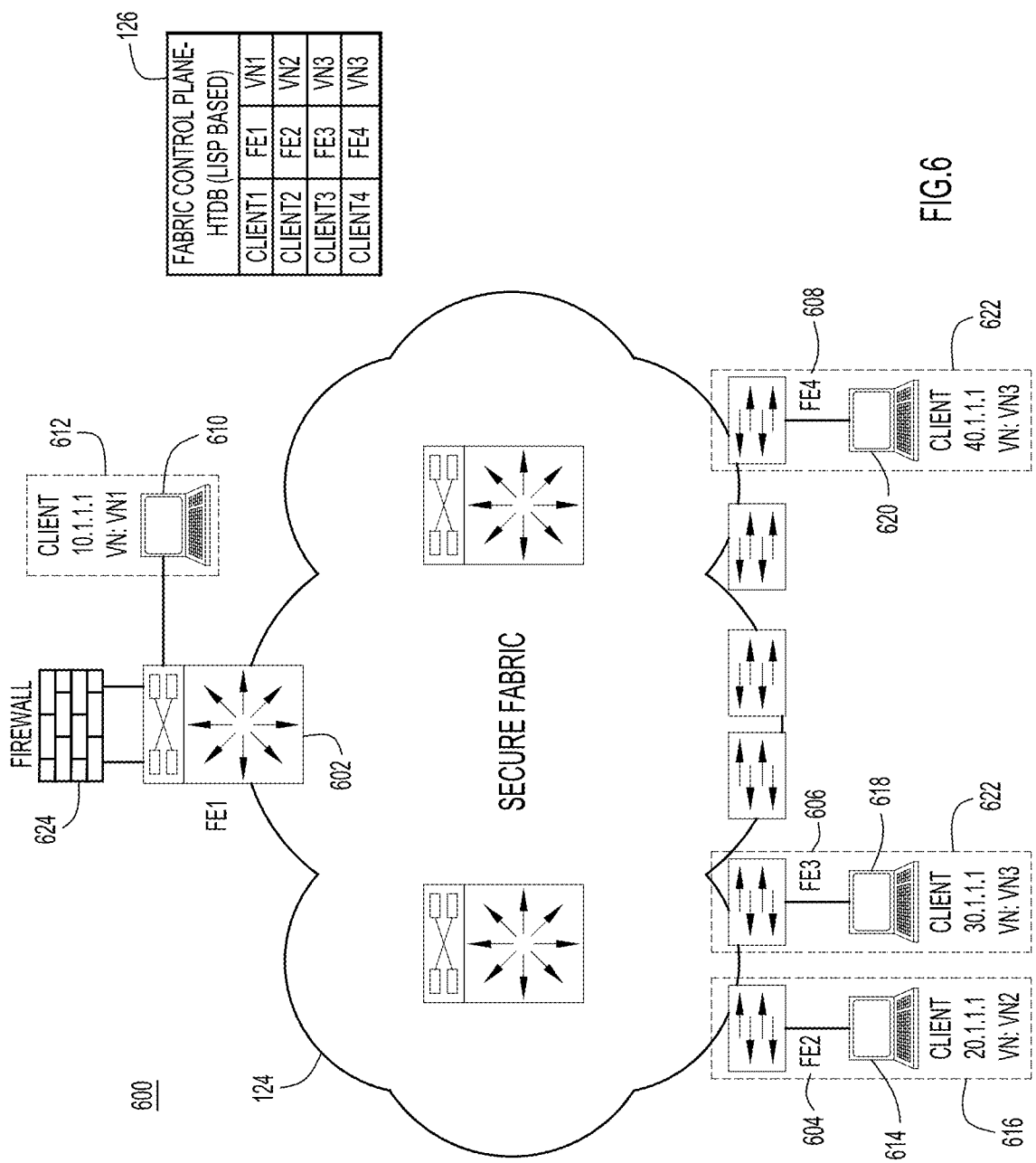
FIG. 6 is a diagram illustrating LISP multicast leaking or extranet feature requirements, according to an example embodiment of this disclosure.

Turning to FIG. 6, FIG. 6 is a diagram 600 illustrating LISP multicast leaking or extranet feature requirements, according to an example embodiment of this disclosure. FIG. 6 is a diagram similar to FIG. 1. FIG. 6 includes the MSMR 126 and a campus fabric 124. Four xTRs FE1 602, FE2 604, FE3 606, and FE4 608 are connected to the campus fabric 124. Connected to FE1 is host 1 indicated by reference numeral 610 in virtual network 1 indicated by reference numeral 612. Connected to FE2 604 is host 2 indicated by reference numeral 614 in virtual network 2 indicated by reference numeral 616. Connected to FE3 606 is host 3 indicated by reference numeral 618 and connected to FE4 608 is host 4 indicated by reference numeral 620. Both hosts 3 and 4 are in virtual network 3 indicated by reference numeral 622. Also shown is a firewall 624. Any network traffic that is leaked is transmitted normally through the firewall 624. Here, virtual network 1 612, virtual network 2 616, and virtual network 3 622 are isolated from each other; in other words, network traffic in virtual network 1 612 cannot be transmitted to virtual networks 2 and 3 616 and 622 without performing network traffic leaking. Therefore, if host 2 614 requests to receive multicast network traffic from host 1 610, the multicast network traffic may be leaked from virtual network 1 612, which includes host 1 610, to virtual network 2 616, which includes host 2 614.

Figure 7:
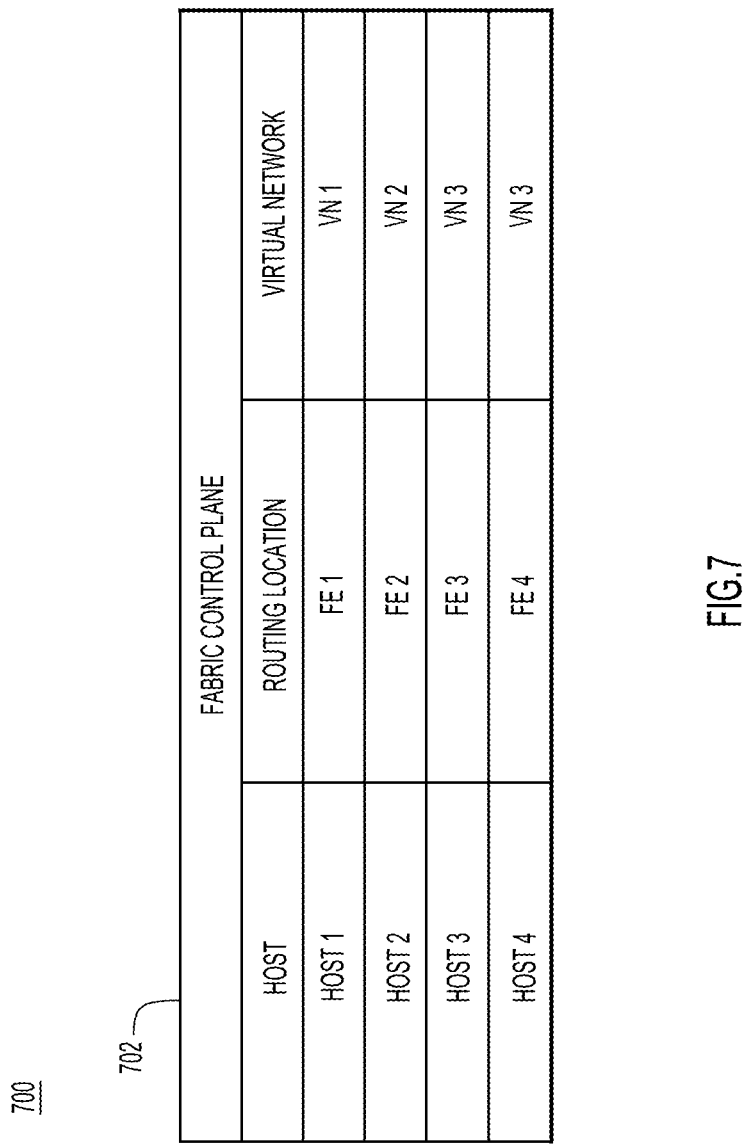
FIG. 7 is a table representing a fabric control plane, according to an example embodiment of this disclosure.

Turning to FIG. 7, FIG. 7 is a table 700 representing a fabric control plane 702 that may be stored at the MSMR 126, according to an example embodiment of this disclosure. FIG. 6 is also referred to in connection with the description of FIG. 7. The fabric control plane 702 may keep track of which virtual network and which xTR (FE1 602, FE2 604, FE3 606, FE4 608), or RLOC identifying the xTR, a given host is in. For example, as shown in FIG. 7, host 1 610 is within virtual network 1 612 with an RLOC of FE1 602. Host 2 614 is within virtual network 2 616 with an RLOC of FE2 604. Hosts 3 and 4 618 and 620 are within virtual network 3 622. However, host 3 618 has an RLOC of FE3 606 while host 4 620 has an RLOC of FE4 608.

Figure 8:
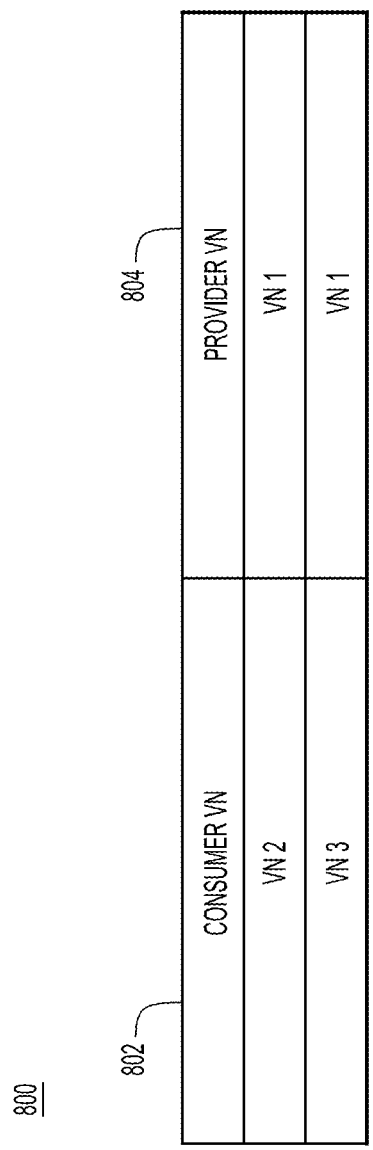
FIG. 8 is a multicast leaking table, according to an example embodiment of this disclosure.

With reference to FIGS. 8 and 9, and continuing reference to FIG. 6, the following is a description of an example embodiment in which only multicast traffic is leaked; no unicast traffic is leaked.

FIG. 8 shows a multicast leaking table 800 maintained at the MSMR 126, according to an example embodiment of this disclosure. The table 800 may have two columns: a column for a consumer virtual network 802 and a column for a provider virtual network 804. The provider virtual network 804 may be the virtual network that includes the host that is the source of the network traffic being multicast to a plurality of hosts. For example, virtual network 1 612 is the provider network for both virtual networks 2 and 3 616 and 618 shown in FIG. 6. In other words, hosts in virtual networks 2 and 3 616 and 618 may be able to subscribe to a multicast session from a host within virtual network 1 612.

FIG. 9 shows a table 900 showing a response from the MSMR 126 in response to a map request from an xTR, according to an example embodiment of this disclosure. The MSMR 126 may reply differently depending on the type of traffic requested. For example, if the requested traffic is unicast traffic, the MSMR 126 may reply with the first row 902 of FIG. 9. Here, the EID of the host transmitting the unicast traffic is 10.1.1.1. The response from the MSMR 126 may also include an RLOC for the 10.1.1.1 EID as well as a source virtual network and a destination virtual network. For example, the source virtual network may be the virtual network from which the request for unicast traffic is sent. In this embodiment, because the traffic is unicast and unicast traffic was not selected to leak across virtual networks, the source virtual network is the same as the destination virtual network: virtual network 1 612 shown in FIG. 6.

On the other hand, if the requested traffic is multicast traffic, then the MSMR 126 may reply with the second row 904 of FIG. 9. Here, the EID of the host transmitting the multicast traffic is 10.1.1.1. The response from the MSMR 126 may also include an RLOC for the 10.1.1.1 EID as well as a source virtual network and a destination virtual network. For example, the source virtual network may be the virtual network from which the request for multicast traffic is sent. In this embodiment, because the traffic is multicast and multicast traffic is selected to leak across virtual networks, the source virtual network may be either virtual network 2 616 or virtual network 3 622 because the multicast leaking table enabled leaking from virtual network 1 to both virtual network 2 616 and virtual network 3 622. Since the host transmitting the multicast traffic is located within the virtual network 1 612 context, the destination virtual network is virtual network 1 612.

Figure 10:
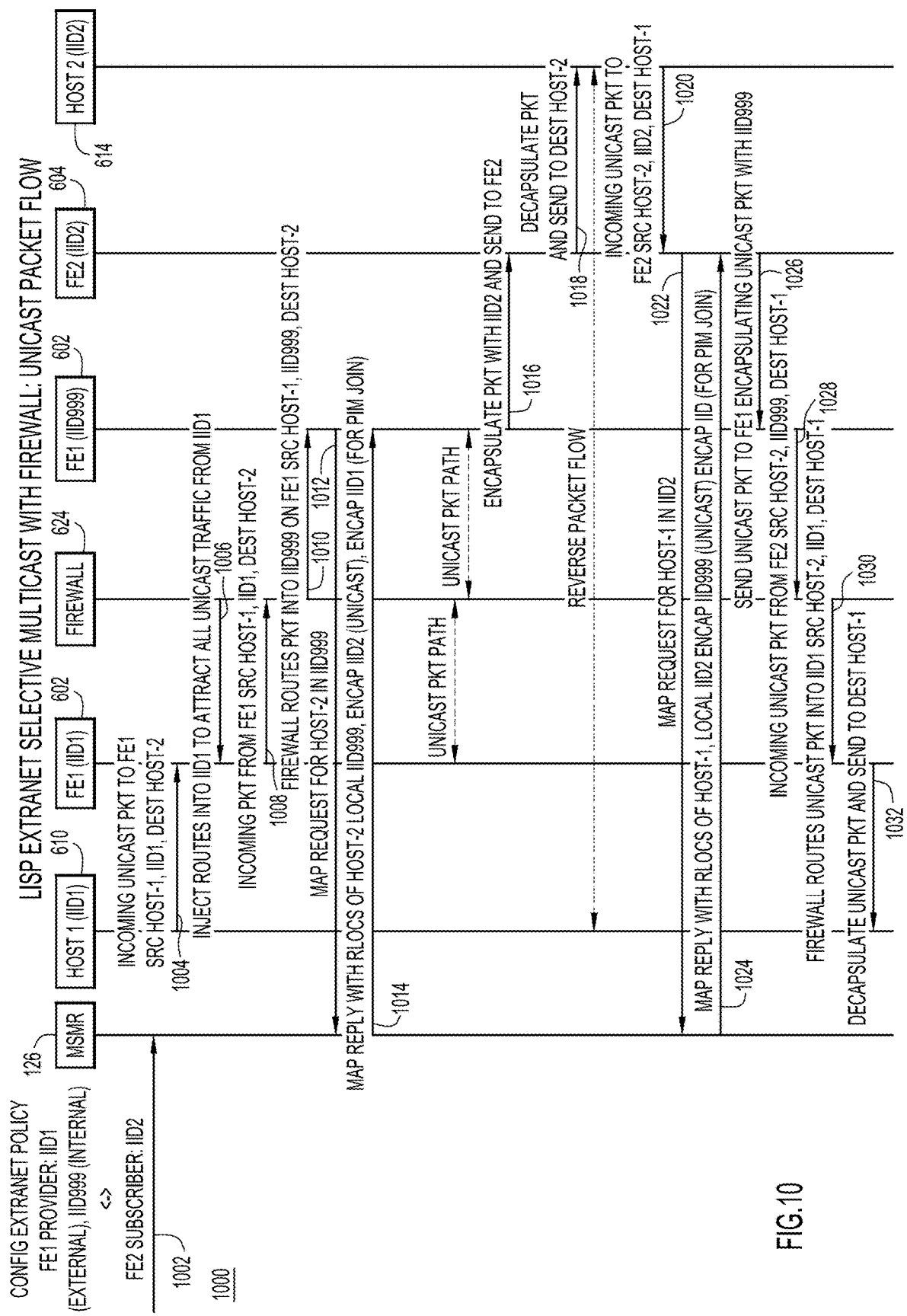
FIG. 10 is a high level sequence diagram of unicast network traffic flows from a first virtual network to a second virtual network when there is multicast leaking with a firewall, according to an example embodiment.

Turning to FIG. 10, FIG. 10 is a high level sequence diagram 1000 of unicast network traffic flows from a first virtual network to a second virtual network when there is multicast leaking with a firewall, according to an example embodiment. Reference is also made to FIG. 6 for purposes of this description. Here, host 2 614 is in virtual network 2 616 and has an RLOC of network device FE2 604. Host 2 614 would like to receive unicast traffic from host 1 610, which may be located in virtual network 1 612 and has an RLOC of network device FE1 602. At 1002, the MSMR 126 may receive an extranet policy. For example, the extranet policy may configure the MSMR 126 so that network device FE1 602 may leak network traffic to network device FE2 604. In this example, network device FE1 602 has an internal IID and an external IID. The internal IID is IID999 and the external IID is IID1. At 1004, host 1 610 may transmit a unicast packet to network device FE1 602 in the IID1 context. The unicast packet may include a source of host 1 610 in the context of IID and a destination of host 2 614. At 1006, the firewall 624 transmits to network device FE1 602 in the IID1 context routes to attract all unicast traffic originating from IID1. At 1008, network device FE1 in the IID context transmits the unicast packet transmitted by host 1 610 at 1004. At 1010, the firewall 624 routes the unicast packet to network device FE1 in the IID999 context.

Responsive to receiving the unicast packet at the network device FE1 602 in the IID999 context, the network device FE1 602 in the IID999 context may transmit a map request for host 2 614 in the IID999 context to the MSMR 126 at 1012. However, host 2 614 is in the IID2 context, not the IID999 context. Therefore, the MSMR 126, at 1014, transmits a map reply to the network device FE1 602 in the IID999 context that includes the RLOC of host 2 614, here network device FE2 604 in the IID999 context. The map reply may include the IID2 context for encapsulation of the unicast packet.

After the network device FE1 602 in the IID999 context receives the map reply from the MSMR 126, the network device FE1 602 in the IID999 context transmits the unicast packet received from host 1 610 to network device FE2 604 in the IID2 context by encapsulating the unicast packet in the IID2 context at 1016. At 1018, the network device FE2 604 in the IID2 context then decapsulates the unicast packet and transmits the unicast packet sent by host 1 610 to host 2 614.

Similar network traffic flows allow host 2 614 to communicate with host 1 and is also illustrated in FIG. 10. Host 2 614 transmits a unicast packet to network device FE2 604 in the IID2 context at 1020. This unicast packet may have a source of host 2 614 in the context of IID2 and a destination of host 1 610. Network device FE2 604 in the IID2 context may then transmit a map request for host 1 610 in the context of IID2 to the MSMR 126 at 1022. However, because host 1 610 is in the context of IID1 and not IID2, the MSMR 126 transmits a map reply, at 1024, to network device FE2 604 in the IID2 context that includes the RLOC of host 1 610 in the context of IID2. Included within the map reply is the network device FE1 602 in the IID999 context for encapsulating unicast packets. At 1026, after receiving the map reply, the network device FE2 604 in the IID2 context transmits the unicast packet to network device FE1 in the IID999 context. Network device FE1 in the IID999 context then transmits the encapsulated unicast packet with a source of host 2 614 in the IID999 context and destination of host 1 610 to the firewall 624 at 1028. The firewall 624 then routes the encapsulated unicast packet to the network device FE1 602 in the IID1 context at 1030. The source remains host 2 614. However, the context changes from the IID999 context to the IID1 context and the destination remains host 1 610. At 1032, the network device FE1 602 in the IID1 context decapsulates the unicast packet and sends the decapsulated unicast packet to host 1 610. In this manner, unicast traffic may be transmitted with leaking between IIDs via firewall 624.

Figure 11:
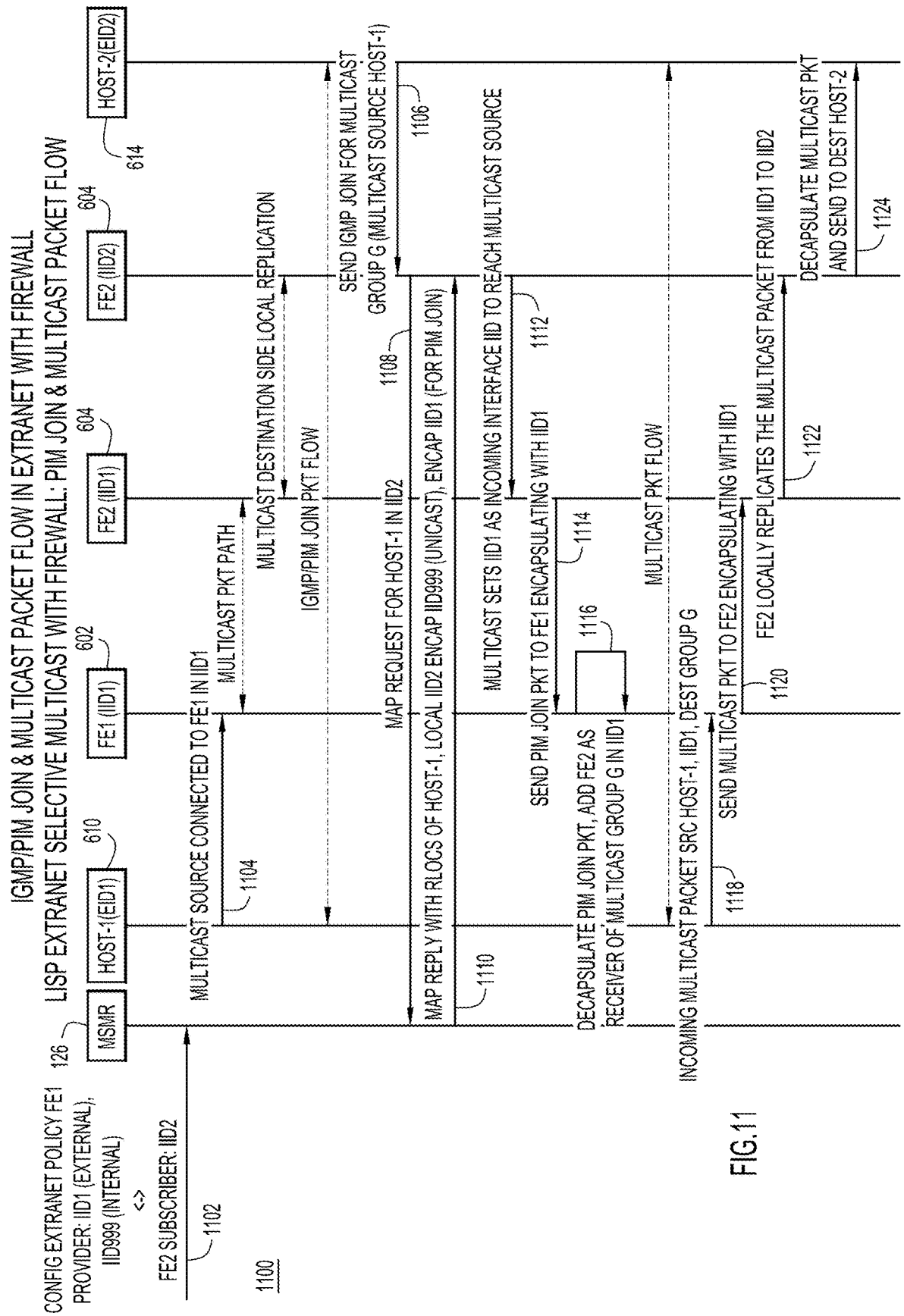
FIG. 11 is a high level sequence diagram of multicast network traffic flows when there is multicast leaking, according to an example embodiment.

Turning to FIG. 11, FIG. 11 is a high level sequence diagram 1100 of multicast network traffic flows when there is multicast leaking, according to an example embodiment. Reference is also made to FIG. 6 for purposes of this description. Here, host 2 614 is in virtual network 2 616 and has an RLOC of network device FE2 604. Host 2 614 would like to receive multicast traffic from host 1 610, which may be located in virtual network 1 612 and has an RLOC of network device FE1 602. At 1102, the MSMR 126 may receive an extranet policy. For example, the extranet policy may configure the MSMR 126 so that the network device FE1 602 in the IID1 context leaks network traffic to network device FE2 604 in the IID2 context. At 1104, host 1 610 connects to network device FE1 602 in the IID1 context. At 1106, host 2 614 transmits an Internet Group Management Protocol (IGMP) join report for a multicast group to network device FE2 604 in the IID2 context, with the multicast source for the multicast group being host 1 610 in the IID1 context. At 1108, network device FE2 604 in the IID2 context transmits a map request for host 1 610 in the IID2 context to the MSMR 126. However, because host 1 610 is in the IID1 context instead of the IID2 context, the MSMR 126 transmits, at 1110, a map reply to network device FE2 604 in the IID2 context that includes the RLOC for host 1 610 in the context of IID2. Included within the map reply is IID1, which may be used for a Protocol Independent Multicast (PIM) join.

At 1112, after receiving the map reply from the MSMR 126, the network device FE2 604 in the IID2 context sets the IID1 context as the incoming interface on the network device FE2 604. This is done to reach the multicast source, i.e., host 1 610, which is in the IID1 context. Network device FE2 604 in the IID1 context may then transmit a PIM join packet to network device FE1 602 in the IID1 context at 1114. The PIM join packet encapsulates the IID1 context received from the MSMR 126. At 1116, after receiving the PIM join packet from network device FE2 604 in the IID1 context, network device FE1 602, also in the IID1 context, decapsulates the PIM join packet. Additionally, network device FE2 602 in the IID1 context adds itself as a receiver of the multicast group.

At 1118, host 1 610 transmits packets to be multicast. These packets have a source of host 1 610 in the context of IID1 and as the destination the multicast group. These packets to be multicast are transmitted to the network device FE1 in the IID1 context. At 1120, network device FE1 602 in the IID1 context transmits the multicast packets to network device FE2 in the IID1 context. At 1122, network device FE2 604 in the IID1 context replicates the multicast packets locally from the IID1 context to the IID2 context. Network device FE2 604 in the IID2 context then decapsulates the multicast packets and transmits the decapsulated packet to host 2 614 at 1123. In this manner, multicast traffic may be transmitted by leaking the multicast traffic from a first IID to a second IID without passing through a firewall.

Figure 12:
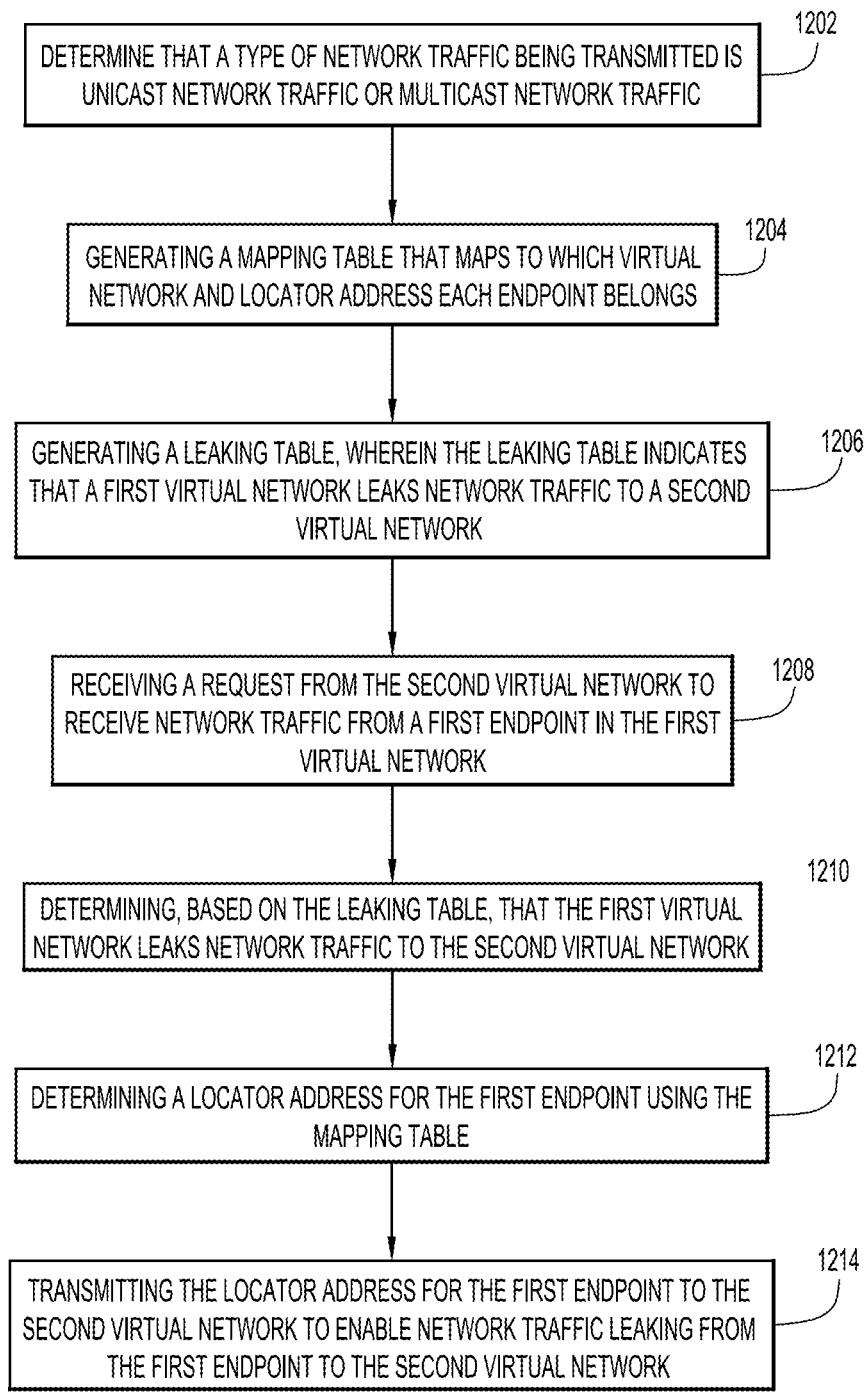
FIG. 12 is a flow chart depicting a method for selectively leaking traffic across virtual networks, according to an example embodiment.

Turning to FIG. 12, FIG. 12 is a flow chart depicting a method 1200 for selectively leaking traffic across virtual networks, according to one embodiment of this disclosure. Reference may also be made to FIGS. 6-9 for purposes of this description. The method 1200 begins at operation 1202, where a device, such as the MSMR 126, may determine what type of network traffic is allowed to be transmitted. In other words, the MSMR 126 may determine if the allowed transmitted network traffic is unicast traffic or multicast traffic. After operation 1202 is completed, the method 1200 may proceed to operation 1204.

At operation 1204, the MSMR 126 may generate a mapping table that maps to which virtual network and which locator address, or RLOC such as FE1 606, each host belongs. The mapping table may be, for example, mapping table 700, as described above with reference to FIG. 7.

At operation 1206, the MSMR 126 may generate a leaking table. The leaking table may include information such as that a first virtual network leaks traffic to a second virtual network. The leaking table may be, for example, leaking table 800, as described above with reference to FIG. 8.

At operation 1208, the MSMR 126 may receive a request from the second virtual network to receive network traffic from a host within the first virtual network. For example, the second virtual network may be virtual network 2 616, the host may be host 1 610, and the first virtual network may be virtual network 1 612.

At operation 1210, the MSMR 126 may determine, based on the leaking table, that the first virtual network leaks network traffic to the second virtual network. For example, the MSMR 126 may determine that virtual network 1 612 leaks network traffic to virtual network 2 616 after performing an action, such as a lookup, in leaking table 800.

At operation 1212, the MSMR 126 may determine a locator address for the first host using the mapping table. For example, the locator address may be an RLOC for a network device. In this example, the network device and its RLOC may be FE1 602. The MSMR 126 may determine this by performing an action, such as a lookup, on mapping table 700.

At operation 1214, the MSMR 126 may transmit the locator address for the first host to the second virtual network, thereby enabling network traffic to leak from the first host to the second virtual network. The method 1200 ends after operation 1214 is completed.

Figure 13:
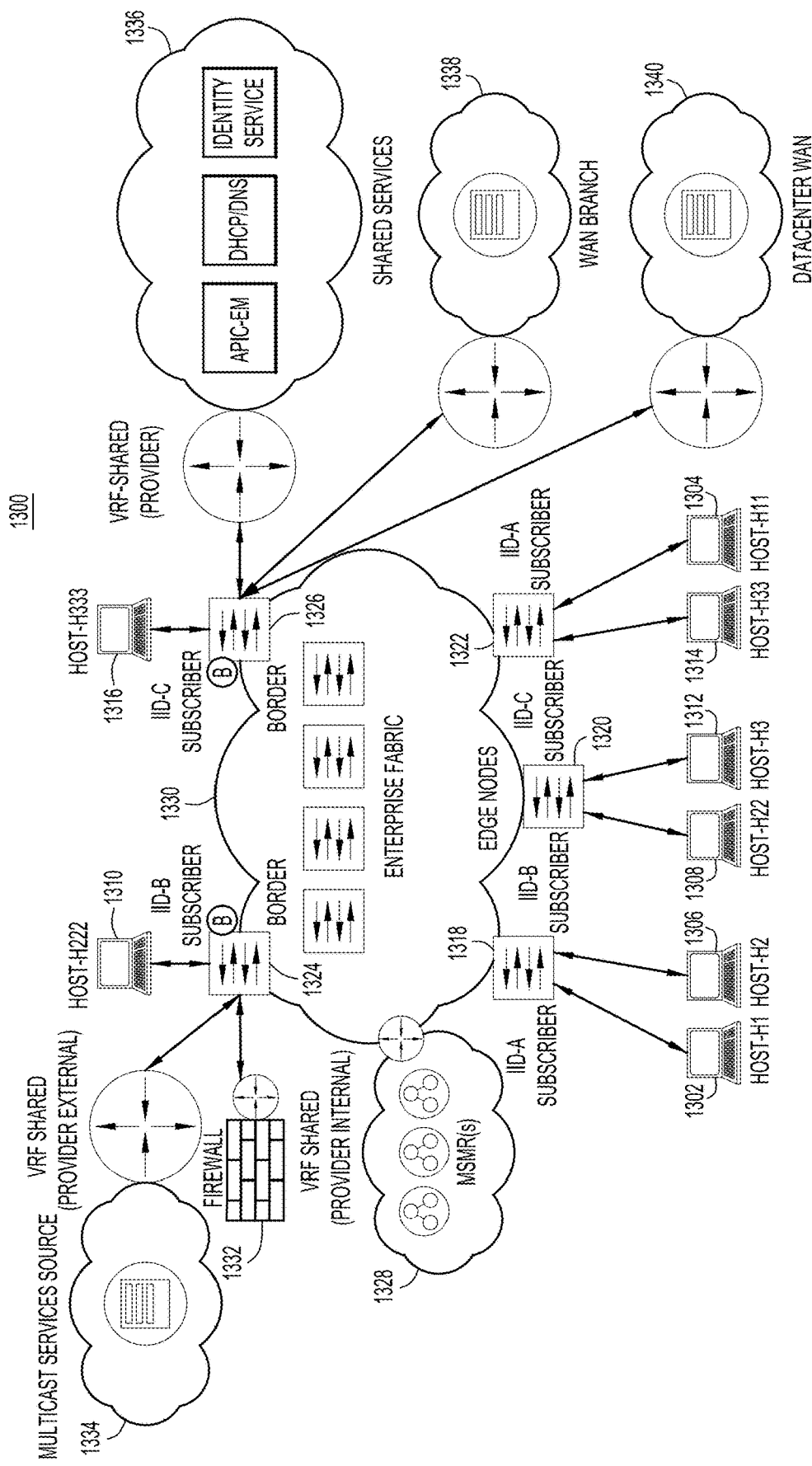
FIG. 13 illustrates a specific network configuration for multicast network traffic leaking in a LISP network, according to an example embodiment.

Turning to FIG. 13, shown is a specific network configuration 1300 for multicast network traffic leaking in a LISP network, according to an example embodiment. The network configuration 1300 includes hosts H1 1302, H11 1304, H2 1306, H22 1308, H222 1310, H3 1312, H33 1314, and H333 1316. Hosts H1 1302 and H2 1306 are connected to network device 1318, hosts H22 1308 and H3 1312 are connected to network device 1320, hosts H33 1314 and H11 1304 are connected to network device 1322, host H222 1310 is connected to network device 1324, and host H333 1316 is connected to network device 1326. Hosts H1 1302 and H11 1304 are part of IID-A, hosts H2 1306, H22 1308, and H222 1310 are part of IID-B, and hosts H3 1312, H33 1314, and H333 1316 are part of IID-C. The network configuration 1300 also includes one or more MSMRs 1328. The network devices 1318, 1320, 1322, 1324, 1326 and the one or more MSMRs 1328 are connected to an enterprise fabric 1330. Connected to network device 1324 are a firewall 1332 and a multicast services source 1334. Connected to network device 1326 are shared services 1336, a WAN branch 1338, and a datacenter WAN 1340.

Because hosts H1 1302 and H11 1304 are part of the same IID, hosts H1 1302 and H11 1304 may transmit network traffic to each other without leaking. However, as described above, hosts in different IIDs may not transmit network traffic to each other. For example, hosts H1 1302 and H11 1304 cannot transmit network traffic to hosts H2 1306, H22 1308, H222 1310, H3 1312, H33 1314, and H333 1316 because they are in different IIDs. Therefore, to transmit network traffic, either unicast or multicast, from a host in IID-A to a host in IID-B or IID-C, the network traffic is required to be leaked. This leaking may be achieved by the methods described above.

In one aspect of this disclosure, a second host in the second virtual network may transmit a request to join a multicast session to a network element identified by a RLOC associated with the second virtual network. The network element transmits the request to receive multicast network traffic based on the request to join a multicast session. The first host may be associated with a network element identified by an RLOC.

In an example embodiment, transmitting the locator address also enables leaking network traffic through a firewall.

In another aspect, the leaking data also indicates that multicast network traffic is leaked from the first virtual network to the second virtual network.

In another example embodiment, the second virtual network includes a network device identified by a RLOC that generates a routing tree to the first host based on the received locator address of the first host.

In another form, a device identified by a routing locator RLOC associated with the first host may receive the multicast network traffic transmitted by the first host.

In still another form, the device identified by the RLOC decapsulates the received multicast network traffic from the first host and transmits the decapsulated multicast network traffic to receivers in both the first virtual network and the second virtual network.

In still another embodiment, an apparatus according to this disclosure may transmit mapping information, in response to receiving a map request from the second virtual network, to the first virtual network. In another form, the mapping information may include a routing locator (RLOC) associated with the first host and an RLOC associated with the second virtual network.

In another aspect, an apparatus may perform a lookup for the first host in a context of the second virtual network.

In another aspect, a transmitted locator address for the first host is transmitted to a routing locator (RLOC) associated with the second virtual network.

Figure 14:
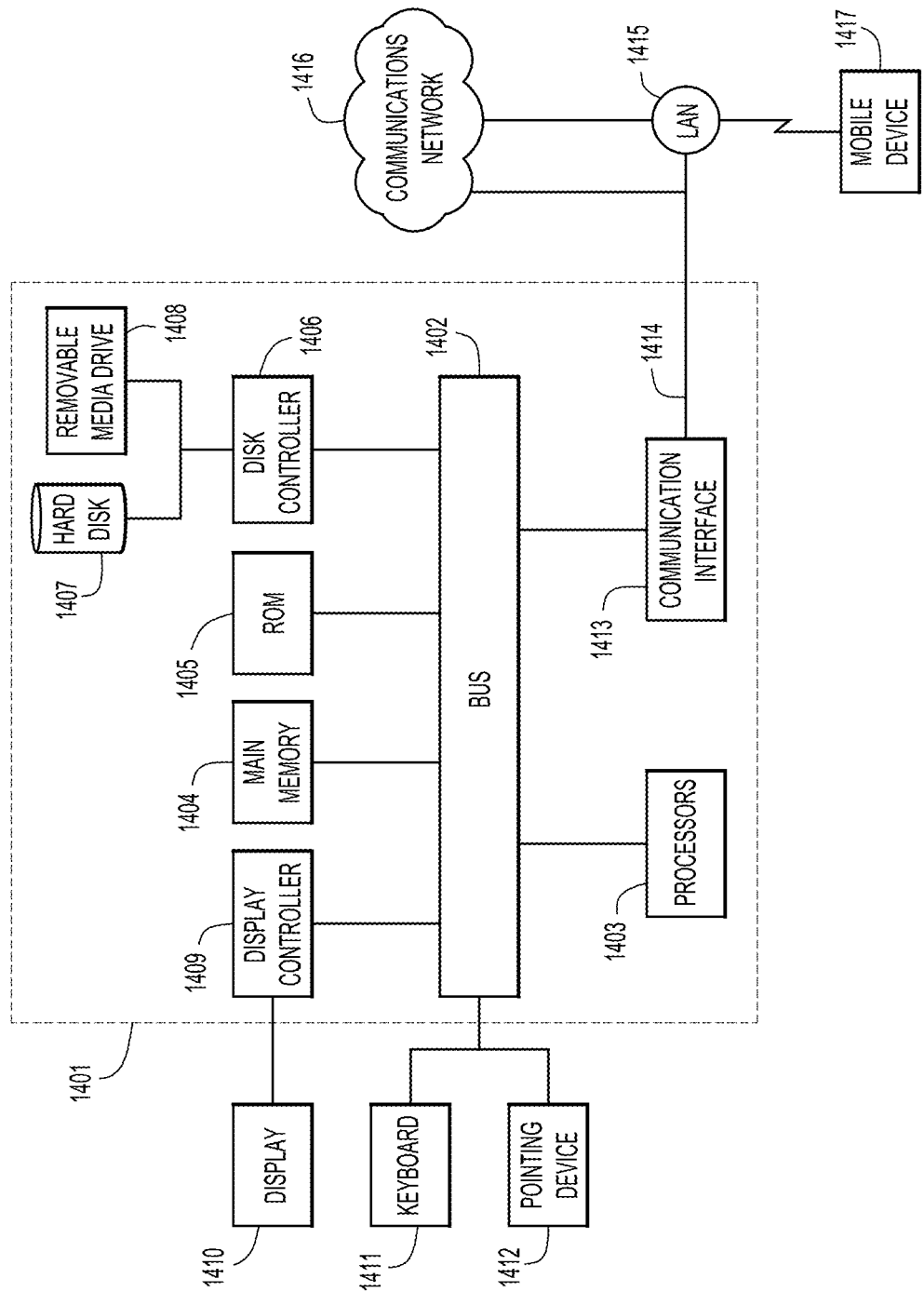
FIG. 14 is a block diagram of a server configured to perform selective traffic leaking techniques, according to an example embodiment.

FIG. 14 is a block diagram showing a server, a server that may perform the functions of MSMR 126 shown in FIGS. 1 and 6, configured to perform the selective traffic leaking techniques, according to an example embodiment. FIG. 14 illustrates a computer system 1401 upon which the embodiments presented may be implemented. The computer system 1401 includes a bus 1402 or other communication mechanism for communicating information, and a processor 1403 coupled with the bus 1402 for processing the information. While the figure shows a signal block 1403 for a processor, it should be understood that the processors 1403 represent a plurality of processing cores, each of which can perform separate processing. The computer system 1401 also includes a main memory 1404, such as a random access memory (RAM) or other dynamic storage device (e.g., dynamic RAM (DRAM), static RAM (SRAM), and synchronous DRAM (SD RAM)), coupled to the bus 1402 for storing information and instructions to be executed by processor 1403. In addition, the main memory 1404 may be used for storing temporary variables or other intermediate information during the execution of instructions by the processor 1403.

The computer system 1401 further includes a read only memory (ROM) 1405 or other static storage device (e.g., programmable ROM (PROM), erasable PROM (EPROM), and electrically erasable PROM (EEPROM)) coupled to the bus 1402 for storing static information and instructions for the processor 1403.

The computer system 1401 also includes a disk controller 1406 coupled to the bus 1402 to control one or more storage devices for storing information and instructions, such as a magnetic hard disk 1407, and a removable media drive 1408 (e.g., floppy disk drive, read-only compact disc drive, read/write compact disc drive, compact disc jukebox, tape drive, and removable magneto-optical drive). The storage devices may be added to the computer system 1401 using an appropriate device interface (e.g., small computer system interface (SCSI), integrated device electronics (IDE), enhanced-IDE (E-IDE), direct memory access (DMA), or ultra-DMA).

The computer system 1401 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)), that, in addition to microprocessors and digital signal processors may individually, or collectively, are types of processing circuitry. The processing circuitry may be located in one device or distributed across multiple devices.

The computer system 1401 may also include a display controller 1409 coupled to the bus 1402 to control a display 1410, such a liquid crystal display (LCD), light emitting diode (LED) display, for displaying information to a computer user. The computer system 1401 includes input devices, such as a keyboard 1411 and a pointing device 1412, for interacting with a computer user and providing information to the processor 1403. The pointing device 1412, for example, may be a mouse, a trackball, or a pointing stick for communicating direction information and command selections to the processor 1403 and for controlling cursor movement on the display 1410.

The computer system 1401 performs a portion or all of the processing steps of the process in response to the processor 1403 executing one or more sequences of one or more instructions contained in a memory, such as the main memory 1404. Such instructions may be read into the main memory 1404 from another computer readable medium, such as a hard disk 1407 or a removable media drive 1408. One or more processors in a multi-processing arrangement may also be employed to execute the sequences of instructions contained in main memory 1404. In alternative embodiments, hard-wired circuitry may be used in place of or in combination with software instructions. Thus, embodiments are not limited to any specific combination of hardware circuitry and software.

As stated above, the computer system 1401 includes at least one computer readable medium or memory for holding instructions programmed according to the embodiments presented, for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SD RAM, or any other magnetic medium, compact discs (e.g., CD-ROM), or any other optical medium, punch cards, paper tape, or other physical medium with patterns of holes, or any other medium from which a computer can read.

Stored on any one or on a combination of non-transitory computer readable storage media, embodiments presented herein include software for controlling the computer system 1401, for driving a device or devices for implementing the process, and for enabling the computer system 1401 to interact with a human user (e.g., print production personnel). Such software may include, but is not limited to, device drivers, operating systems, development tools, and applications software. Such computer readable storage media further includes a computer program product for performing all or a portion (if processing is distributed) of the processing presented herein.

The computer code devices may be any interpretable or executable code mechanism, including but not limited to scripts, interpretable programs, dynamic link libraries (DLLs), Java classes, and complete executable programs. Moreover, parts of the processing may be distributed for better performance, reliability, and/or cost.

The computer system 1401 also includes a communication interface 1413 coupled to the bus 1402. The communication interface 1413 provides a two-way data communication coupling to a network link 1414 that is connected to, for example, a local area network (LAN) 1415, or to another communications network 1416 such as the Internet. For example, the communication interface 1413 may be a wired or wireless network interface card to attach to any packet switched (wired or wireless) LAN. As another example, the communication interface 1413 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 1413 sends and receives electrical, electromagnetic or optical signals that carry digital data streams representing various types of information.

The network link 1414 typically provides data communication through one or more networks to other data devices. For example, the network link 1414 may provide a connection to another computer through a local area network 1415 (e.g., a LAN) or through equipment operated by a service provider, which provides communication services through a communications network 1416. The local network 1414 and the communications network 1416 use, for example, electrical, electromagnetic, or optical signals that carry digital data streams, and the associated physical layer (e.g., CAT 5 cable, coaxial cable, optical fiber, etc.). The signals through the various networks and the signals on the network link 1414 and through the communication interface 1413, which carry the digital data to and from the computer system 1401 maybe implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 1401 can transmit and receive data, including program code, through the network(s) 1415 and 1416, the network link 1414 and the communication interface 1413. Moreover, the network link 1414 may provide a connection through a LAN 1415 to a mobile device 1417 such as a personal digital assistant (PDA) laptop computer, or cellular telephone.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

In summary, a method is provided that includes: determining that a type of network traffic being transmitted is unicast network traffic or multicast network traffic; generating mapping data that maps to which virtual network and locator address each host of a plurality of hosts belongs; generating leaking data for unicast network traffic and multicast network traffic, wherein the leaking data indicates that a first virtual network leaks network traffic to a second virtual network; receiving a request from the second virtual network to receive network traffic from a first host in the first virtual network; determining, based on the leaking data and the type of network traffic being transmitted, if the first virtual network leaks network traffic to the second virtual network; if the first virtual network leaks network traffic to the second virtual network, determining a locator address for the first host in the first virtual network using the mapping data; and transmitting the locator address for the first host to the second virtual network to enable network traffic leaking from the first host to the second virtual network is disclosed.

In another aspect, an apparatus is provided comprising a communication interface configured to enable network communications; and a processing device coupled with the communication interface, and configured to: determine that a type of network traffic being transmitted is unicast network traffic or multicast network traffic; generate mapping data that maps to which virtual network and locator address each host of a plurality of hosts belongs; generate leaking data for unicast network traffic and multicast network traffic, wherein the leaking data indicates that a first virtual network leaks network traffic to a second virtual network; receive a request from the second virtual network to receive network traffic from a first host in the first virtual network; determine, based on the leaking data and the type of network traffic being transmitted, if the first virtual network leaks network traffic to the second virtual network; if the first virtual network leaks network traffic to the second virtual network, determine a locator address for the first host in the first virtual network using the mapping data; and transmit the locator address for the first host to the second virtual network to enable network traffic leaking from the first host to the second virtual network.

In yet another aspect, a non-transitory computer-readable storage media is provided encoded with computer executable instructions that when executed by a processor, cause the processor to perform operations including: determining that a type of network traffic being transmitted is unicast network traffic or multicast network traffic; generating mapping data that maps to which virtual network and locator address each host of a plurality of hosts belongs; generating leaking data for unicast network traffic and multicast network traffic, wherein the leaking data indicates that a first virtual network leaks network traffic to a second virtual network; receiving a request from the second virtual network to receive network traffic from a first host in the first virtual network; determining, based on the leaking data and the type of network traffic being transmitted, if the first virtual network leaks network traffic to the second virtual network; if the first virtual network leaks network traffic to the second virtual network, determining a locator address for the first host in the first virtual network using the mapping data; and transmitting the locator address for the first host to the second virtual network to enable network traffic leaking from the first host to the second virtual network.

It will also be understood that, although the terms "first," "second," etc. may be used herein to describe various elements, these elements should not be limited by these terms. These terms are only used to distinguish one element from another. For example, a first contact could be termed a second contact, and, similarly, a second contact could be termed a first contact, which changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The above description is intended by way of example only.

What is claimed is:

1. A method comprising:
   determining that a type of network traffic, in a Locator/Identifier Separation Protocol (LISP) network, being transmitted is unicast network traffic or multicast network traffic;
   generating mapping data that maps to which virtual network and locator address each host of a plurality of hosts belongs;
   generating leaking data for unicast network traffic and multicast network traffic, wherein the leaking data indicates that a first virtual network leaks network traffic to a second virtual network;
   receiving a request from the second virtual network to receive network traffic from a first host in the first virtual network;
   determining, based on the leaking data and the type of network traffic being transmitted, if the first virtual network leaks network traffic to the second virtual network;

if the first virtual network leaks network traffic to the second virtual network, determining a locator address for a second host in the second virtual network using the mapping data; and transmitting the locator address for the second host to the first virtual network to enable network traffic leaking from the first host to the second virtual network;

the method further comprising:

when the second host is no longer reachable at the locator address, causing a solicit map request to be sent from the second virtual network to the first virtual network to trigger the first virtual network to obtain a new locator address of the second host;

sending, from a first tunnel router to a second tunnel router in a first context defined by a first instance identifier (IID), a locator address probe for an endpoint identifier of the second host, wherein the probe is encapsulated with a second IID of the second tunnel router, and the probe includes an indication of the first IID; and receiving, from the second tunnel router, a reply to the probe using the first IID.

2. The method of claim 1, further comprising the second host in the second virtual network transmitting a request to join a multicast session to a network element identified by a routing locator (RLOC) associated with the second virtual network, wherein the network element transmits the request to receive multicast network traffic based on the request to join a multicast session.

3. The method of claim 1, wherein transmitting the locator address further enables leaking network traffic through a firewall.

4. The method of claim 1, wherein the leaking data further indicates that multicast network traffic is leaked from the first virtual network to the second virtual network.

5. The method of claim 1, wherein the second virtual network includes a network device identified by a routing locator (RLOC) that generates a routing tree to the first host based on the locator address of the first host.

6. The method of claim 1, further comprising a device identified by a routing locator (RLOC) associated with the first host receiving the multicast network traffic transmitted by the first host.

7. The method of claim 6, further comprising the device identified by the RLOC decapsulating the received multicast network traffic from the first host and transmitting the decapsulated multicast network traffic to receivers in both the first virtual network and the second virtual network.

8. An apparatus comprising:

a communication interface configured to enable network communications;

a processor coupled with the communication interface, and configured to:

determine that a type of network traffic, in a Locator/Identifier Separation Protocol (LISP) network, being transmitted is unicast network traffic or multicast network traffic;

generate mapping data that maps to which virtual network and locator address each host of a plurality of hosts belongs;

generate leaking data for unicast network traffic and multicast network traffic, wherein the leaking data indicates that a first virtual network leaks network traffic to a second virtual network;

receive a request from the second virtual network to receive network traffic from a first host in the first virtual network;

determine, based on the leaking data and the type of network traffic being transmitted, if the first virtual network leaks network traffic to the second virtual network;

if the first virtual network leaks network traffic to the second virtual network, determine a locator address for a second host in the second virtual network using the mapping data; and transmit the locator address for the second host to the first virtual network to enable network traffic leaking from the first host to the second virtual network;

the processor further configured to:

when the second host is no longer reachable at the locator address, cause a solicit map request to be sent from the second virtual network to the first virtual network to trigger the first virtual network to obtain a new locator address of the second host;

send, from a first tunnel router to a second tunnel router in a first context defined by a first instance identifier (IID), a locator address probe for an endpoint identifier of the second host, wherein the probe is encapsulated with a second IID of the second tunnel router, and the probe includes an indication of the first IID; and receiving, from the second tunnel router, a reply to the probe using the first IID.

9. The apparatus of claim 8, wherein the processor is configured to transmit mapping information, in response to receiving a map request from the second virtual network, to the first virtual network.

10. The apparatus of claim 9, wherein the mapping information comprises a routing locator (RLOC) associated with the first host and an RLOC associated with the second virtual network.

11. The apparatus of claim 8, wherein transmitting the locator address further enables leaking network traffic through a firewall.

12. The apparatus of claim 8, wherein the leaking data further indicates that multicast traffic is leaked from the first virtual network to the second virtual network.

13. The apparatus of claim 8, wherein the processor is further configured to perform a lookup for the first host in a context of the second virtual network.

14. The apparatus of claim 8, wherein the transmitted locator address for the first host is transmitted to a routing locator (RLOC) associated with the second virtual network.

15. A non-transitory computer-readable storage media encoded computer executable instructions that, when executed by a processor, cause the processor to perform operations including:

determining that a type of network traffic, in a Locator/Identifier Separation Protocol (LISP) network, being transmitted is unicast network traffic or multicast network traffic;

generating mapping data that maps to which virtual network and locator address each host of a plurality of hosts belongs;

generating leaking data for unicast network traffic and multicast network traffic, wherein the leaking data indicates that a first virtual network leaks network traffic to a second virtual network;

receiving a request from the second virtual network to receive network traffic from a first host in the first virtual network;

determining, based on the leaking data and the type of network traffic being transmitted, if the first virtual network leaks network traffic to the second virtual network;

if the first virtual network leaks network traffic to the second virtual network, determining a locator address for a second host in the second virtual network using the mapping data;

transmitting the locator address for the second host to the first virtual network to enable network traffic leaking from the first host to the second virtual network;

when the second host is no longer reachable at the locator address, causing a solicit map request to be sent from the second virtual network to the first virtual network to trigger the first virtual network to obtain a new locator address of the second host;

sending, from a first tunnel router to a second tunnel router in a first context defined by a first instance identifier (IID), a locator address probe for an endpoint identifier of the second host, wherein the probe is encapsulated with a second IID of the second tunnel router, and the probe includes an indication of the first IID; and receiving, from the second tunnel router, a reply to the probe using the first IID.

16. The computer-readable storage media of claim 15, wherein the operations further comprise transmitting mapping information, in response to receiving a map request from the second virtual network, to the first virtual network.

17. The computer-readable storage media of claim 16, wherein the mapping information comprises a routing locator (RLOC) associated with the first host and an RLOC associated with the second virtual network.

18. The computer-readable storage media of claim 15, wherein transmitting the locator address further enables leaking network traffic through a firewall.

19. The computer-readable storage media of claim 15, wherein the leaking data further indicates that multicast traffic is leaked from the first virtual network to the second virtual network.

20. The computer-readable storage media of claim 19, wherein the transmitted locator address for the first host is transmitted to a routing locator (RLOC) associated with the second virtual network.

* * * * *

UNITED STATES PATENT AND TRADEMARK OFFICE
CERTIFICATE OF CORRECTION

PATENT NO. : 10,547,467 B2
APPLICATION NO. : 15/792180
DATED : January 28, 2020
INVENTOR(S) : Sanjay Kumar Hooda et al.

Page 1 of 1

It is certified that error appears in the above-identified patent and that said Letters Patent is hereby corrected as shown below:

On the Title Page

Item (73) Assignee:
Please change "Cisco Technology, San Jose, CA (US)" to --Cisco Technology, Inc., San Jose, CA (US)--

Signed and Sealed this
Tenth Day of March, 2020

Andrei Iancu
*Director of the United States Patent and Trademark Office*